United States Patent [19]
Hanson et al.

[11] Patent Number: 6,014,427
[45] Date of Patent: *Jan. 11, 2000

[54] VOICE MAIL WITH EMBEDDED EXECUTABLE RESPONSES

[75] Inventors: Bruce Lowell Hanson; Kenneth Mervin Huber, both of Monmouth County, N.J.

[73] Assignee: AT&T Corp, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/773,151

[22] Filed: Dec. 26, 1996

[51] Int. Cl.⁷ ..................................................... H04M 1/64

[52] U.S. Cl. ........................ 379/67.1; 379/76; 379/88.01; 379/88.18

[58] Field of Search .................................. 379/67, 88, 89, 379/88.02, 88.18, 88.26, 67.1, 88.01, 88.09, 88.11, 88.12, 88.13, 88.15, 88.22

[56] References Cited

U.S. PATENT DOCUMENTS

| | | | |
|---|---|---|---|
| 4,625,081 | 11/1986 | Lotito et al. | 379/88 |
| 4,757,525 | 7/1988 | Matthews et al. | 379/89 |
| 5,027,384 | 6/1991 | Morganstein | 379/67 |
| 5,222,125 | 6/1993 | Creswell et al. | 379/67 |
| 5,327,486 | 7/1994 | Wolff et al. | 379/96 |
| 5,513,117 | 4/1996 | Small | 364/479 |
| 5,592,537 | 1/1997 | Moen | 379/67 |
| 5,619,554 | 4/1997 | Hogan et al. | 379/67 |

*Primary Examiner*—Fan S. Tsang
*Assistant Examiner*—Allan Hoosain

[57] ABSTRACT

A creator of a voice mail message is provided with the ability to pre-define responses to the message. The pre-defined responses may be sent (i.e., are embedded) with the voice mail message to a recipient's mailbox so that when the recipient opens the voice message, the message is heard, and the recipient is provided with a menu of pre-defined responses from which to choose. After listening to the pre-defined responses, the recipient selects a particular response which is then forwarded to the creator of the original voice mail message.

25 Claims, 9 Drawing Sheets

FROM FIG.4A
[G] 6

430 — AMSG ADDS NUMERIC VALUE COLLECT MODULE TO SCRIPT AND PROMPT, "PLEASE PROMPT YOUR CALLERS 0 TERMINATE NUMERIC ENTRIES WITH THE POUND SIGN"

FROM FIG.4A
[C] 5

432 — AMSG ADDS CALL TRANSFER MODULE TO SCRIPT AND PROMPTS, "PLEASE ENTER THE TEN DIGIT TELEPHONE NUMBER TO WHICH CALLS WILL BE TRANSFERRED"

434 — USER ENTERS A TEN DIGIT PHONE NUMBER AND AMSG INCLUDES IN TRANSFER MODULE

[E] FROM FIG.4A

428 — USER RECORDS AUDIO CLIPS USING STANDARD VOICE MAIL TOOLS AND AMSG INCLUDES IN CLIP MODULE 1,2,4 — 418 — AMSG ADDS SELECTED RESPONSE COLLECT/RECORD MODULES TO MESSAGE SCRIPT AND CHECK NUMBER OF CHOICES MADE

FROM FIG.4A
[D]

(F) NO ← 414 HAVE ALL N CHOICES BEEN MADE ?

TO FIG.4A

YES

422 — SYSTEM PROMPTS, "YOU MAY NOW RECORD YOUR MESSAGE. BE SURE TO INCLUDE AN APPROPRIATE PROMPT FOR EACH OF YOUR CHOSEN RESPONSE OPTIONS."

424 — SYSTEM HANDLES REVIEW, RE-RECORD, MESSAGE ADDRESSING, AND DELIVERY IN THE NORMAL MANNER

436 — AMSG STORES COMPLETED SCRIPT AND ASSOCIATED VOICE MESSAGE AND CLIPS IN OUTGOING MESSAGE DATABASE, AMSG ALSO ASSIGNS UNIQUE ACTION MESSAGE ID TO THIS MESSAGE SO ACTION RESPONSES TO IT CAN BE IDENTIFIED AND TRACK

END

SENDER ID 908-555-1234

FOR YOUR ACTION MESSAGE OF 11:15 AM. OCTOBER 4, 1996. ID #002: TEMPLATE # 4: 3 CHOICES WITH INDIVIDUAL ADDRESSES RETURNED — 902

THE FOLLOWING RESPONSES HAVE BEEN RECEIVED AS OF 10:00 PM, OCTOBER 6,1996:
9 MESSAGES SENT, 7 REPLIES RECEIVED — 904

3 RESPONDENTS SELECTED OPTION 1: — 906

| RESPONDENT ID | RESPONSE DATE/TIME |
|---|---|
| 908-567-8976 | 11:48 AM, 10/04/1996 |
| 312-444-1115 | 5:22 PM, 10/04/1996 |
| 908-567-9876 | 10.48 PM, 10/05/1996 |

2 RESPONDENTS SELECTED OPTION 2: — 908

| RESPONDENT ID | RESPONSE DATE/TIME |
|---|---|
| 609-222-2323 | 10:13 AM, 10/04/1996 |
| 312-444-1115 | 9:22 PM, 10/05/1996 |

2 RESPONDENTS SELECTED OPTION 3: — 910

| RESPONDENT ID | RESPONSE DATE/TIME |
|---|---|
| 619-555-1234 | 2:45 PM, 10/04/1996 |
| 212-987-7755 | 8:20 AM, 10/06/1996 |

2 RECIPIENTS HAVE NOT YET REPLIED — 912

| RECIPIENT ID |
|---|
| 201-236-6563 |
| 718-334-1119 |

VOICE MAIL WITH EMBEDDED EXECUTABLE RESPONSES

TECHNICAL FIELD

The invention relates to telecommunications. More particularly, the invention relates to voice mail with embedded executable responses.

BACKGROUND OF THE INVENTION

Voice mail has become a widely used channel of communication in both home and office environments. Conventional voice mail systems allow a sender to leave a message for a recipient to facilitate communication between them, for example, when the recipient is busy or away from a telephone. Typically, such voice mail systems provide the ability to the sender to record and leave an audio message in the recipient's voice mailbox. Some voice mail systems provide the sender with a selection of fixed options that may be applied to a particular voice message. For example, the sender may give priority status to a message so that the recipient will hear such a priority message before hearing other messages in the mailbox. A message may be made private so that the recipient is precluded from forwarding such a private message to other parties. A sender may also have an ability to send a message to multiple recipients.

The recipient of a voice mail message, upon accessing his or her voice mailbox at some convenient time, may then listen to the message sent by the sender. Voice mail systems generally provide the recipient with a number of fixed options such as the ability to save the message, forward the message to other parties, and record a reply message to be forwarded to the sender of the original message.

While many known voice mail systems function quite satisfactorily in many applications, the options that are provided to the users are generic in that no options may be customized and applied to a particular message. Consequently, a need exists for enhanced voice mail capabilities where users would have better control over the information contained in a voice mail message.

SUMMARY OF THE INVENTION

The need for enhanced voice mail capabilities is met by the present invention where a creator of a voice mail message is provided with the ability to pre-define responses to the message. The pre-defined responses may be sent (i.e, are embedded) with the voice mail message to a recipient's mailbox so that when the recipient opens the voice message, the message is heard, and the recipient is provided with a menu of pre-defined responses from which to choose. After listening to the pre-defined responses, the recipient selects a particular response which is then forwarded to the creator of the original voice mail message or otherwise acted upon.

In an illustrative example of the invention, a computer supply business may use the invention by sending a voice mail message to a customer who has recently purchased a personal computer. The message thanks the customer for the business and then prompts the customer to "press one on your touch tone phone if everything is working well with the computer, press two if you are having problems with installation and would like a technician to call you, or press three if you would like a call back next month to check that everything is satisfactory." After the customer accesses the mailbox and receives the message (including the pre-defined responses), the customer makes the desired selection and the response is returned to the sending business or its voice mailbox. Different such menus may be provided for different businesses and applications.

Other examples of the invention are provided to highlight additional inventive features: responses may be counted, which may be useful in polling applications; identities of the recipients may be returned to the message sender; the selection of certain responses may be used to trigger the playback of additional message content; audio segments or digital data may be recorded by the recipient as part of a response returned to a message creator; a telephone call may be initiated as part of a predefined response; and advantageous combinations of the aforementioned features may be utilized in some applications.

DETAILED DESCRIPTION

Figure 1:
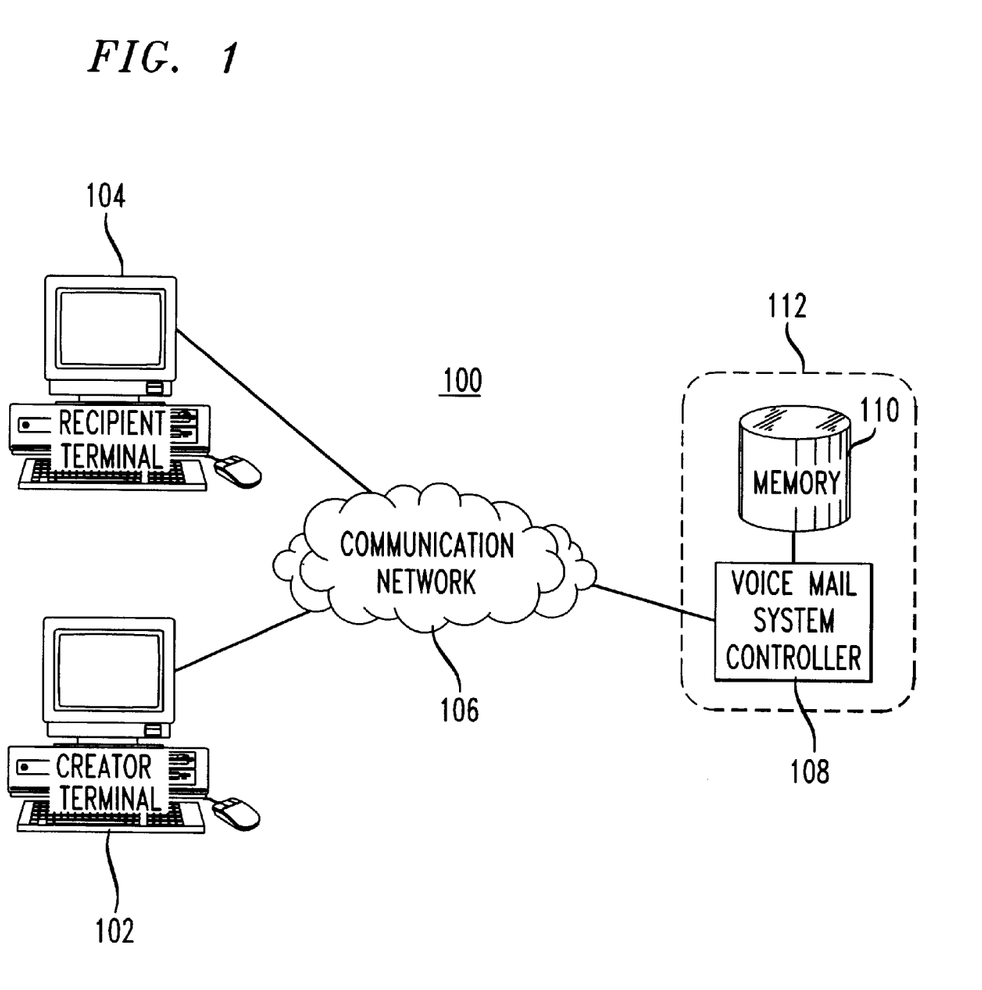
FIG. 1 is a simplified block diagram of an illustrative voice mail system which facilitates practice of the invention.

FIG. 1 is a simplified block diagram of a voice mail system 100 which facilitates practice of the invention. Shown are creator terminal 102, recipient terminal 104, communication network 106, voice mail system controller 108, and memory 110. Terminals 102 and 104, in this illustrative example of the invention, are conventional telephones. However, multi-media-capable computers, wireless personal communication devices, cellular telephones, paging devices may also be used with particular advantage in certain applications of the invention. Such devices are known and are described in further detail herein. Communication network 106 may be a public switched telephone network ("PSTN"), a computer network such as the Internet, a private branch exchange, and the like. Communication network 106 carries information to terminals 104 and 106 as well as to voice mail system controller 108 which are coupled to the network as shown. Voice mail system controller 108 is coupled to memory 110, which is used to store voice mail messages in individual mailboxes under the control of voice mail system controller 108. Memory 110 may also be used to store system information and prompts which facilitate use of the voice mail system. Voice mail system controller 108 and memory 110 form voice mailbox system 112.

In accordance with the principles of the invention, a creator of a voice message at creator terminal 102 dials through the communication network 106 to voice mail system controller 108. Voice mail system controller 108, using conventional automated response unit technology such as that sold by Lucent Technologies Inc. under the tradename Conversant® (not shown), may then interact with the message creator at terminal 102 so that the inventive voice mail message may be created and delivered to the intended recipient. To aid in the clarity of presentation of the inventive concepts, the inventive voice mail message is referred to herein as an "action message" to distinguish it from conventional voice mail. The term "action" is used because the recipient is prompted to take action to the message rather than merely take a passive interest as with conventional voice mail.

Figure 2:
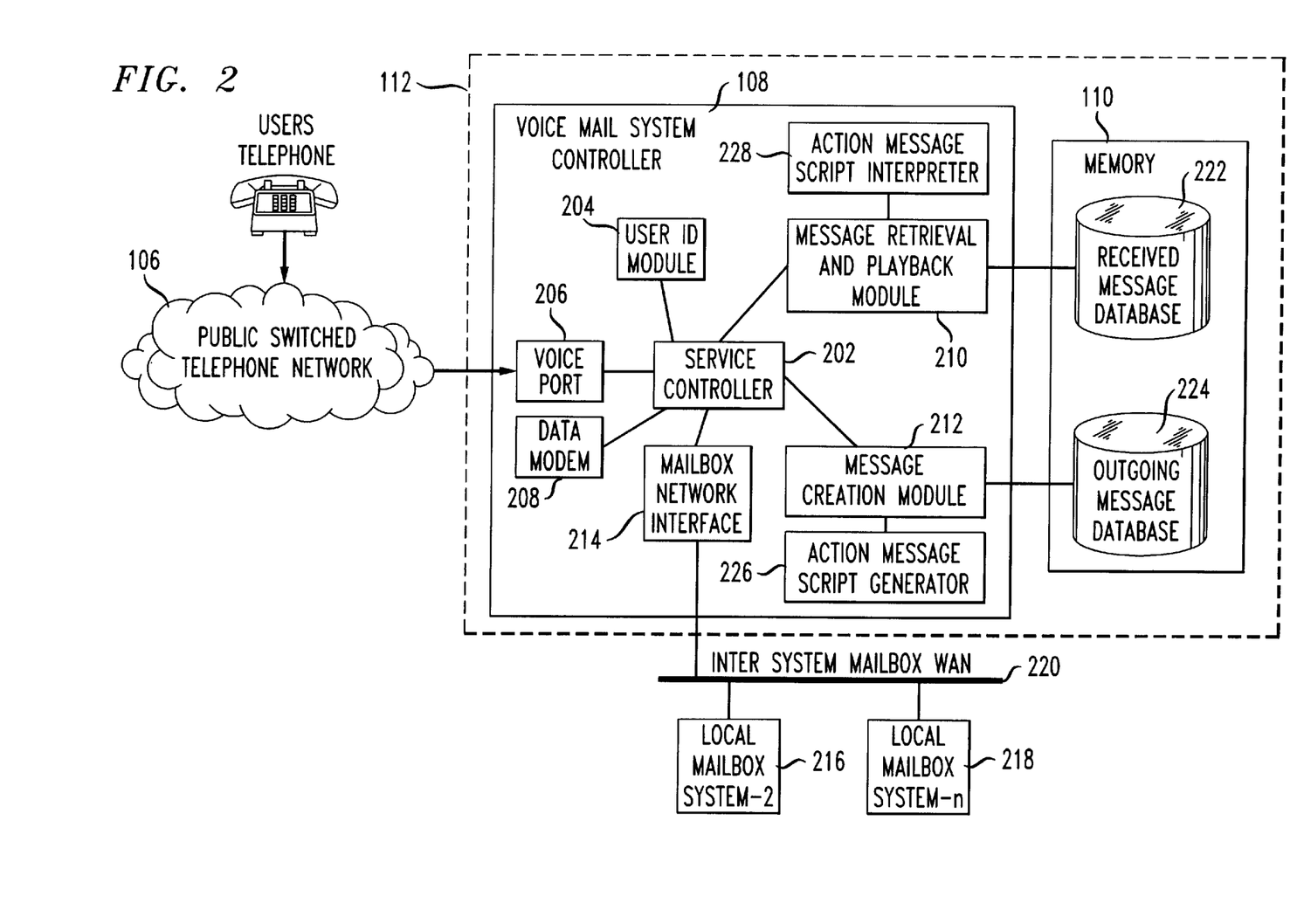
FIG. 2 is a simplified block diagram of a flowchart of an illustrative voice mail system particularly showing details of the voice mail system controller and memory, in accordance with the principles of the invention.

Referring now to FIG. 2, there is shown a simplified block diagram of an illustrative voice mail system, in accordance with the principles of the invention. More specifically, FIG. 2 illustrates details of the voice mail system controller 108 shown in FIG. 1. Included within voice mail system controller 108 are service controller 202 which is operably coupled to User ID system 204, voice port 206, data modem 208, message retrieval and playback system 210, and message creation system 212. Service controller 202 is also optionally coupled to mailbox network interface 214. Mailbox network interface 214 may be used to facilitate communication (via inter-system mailbox local area network 220) with other remotely located voice mailbox systems including local mailbox system 2 . . . local mailbox system n, which are designated by reference numerals 216 and 218, respectively, as shown in FIG. 2.

Figure 3:
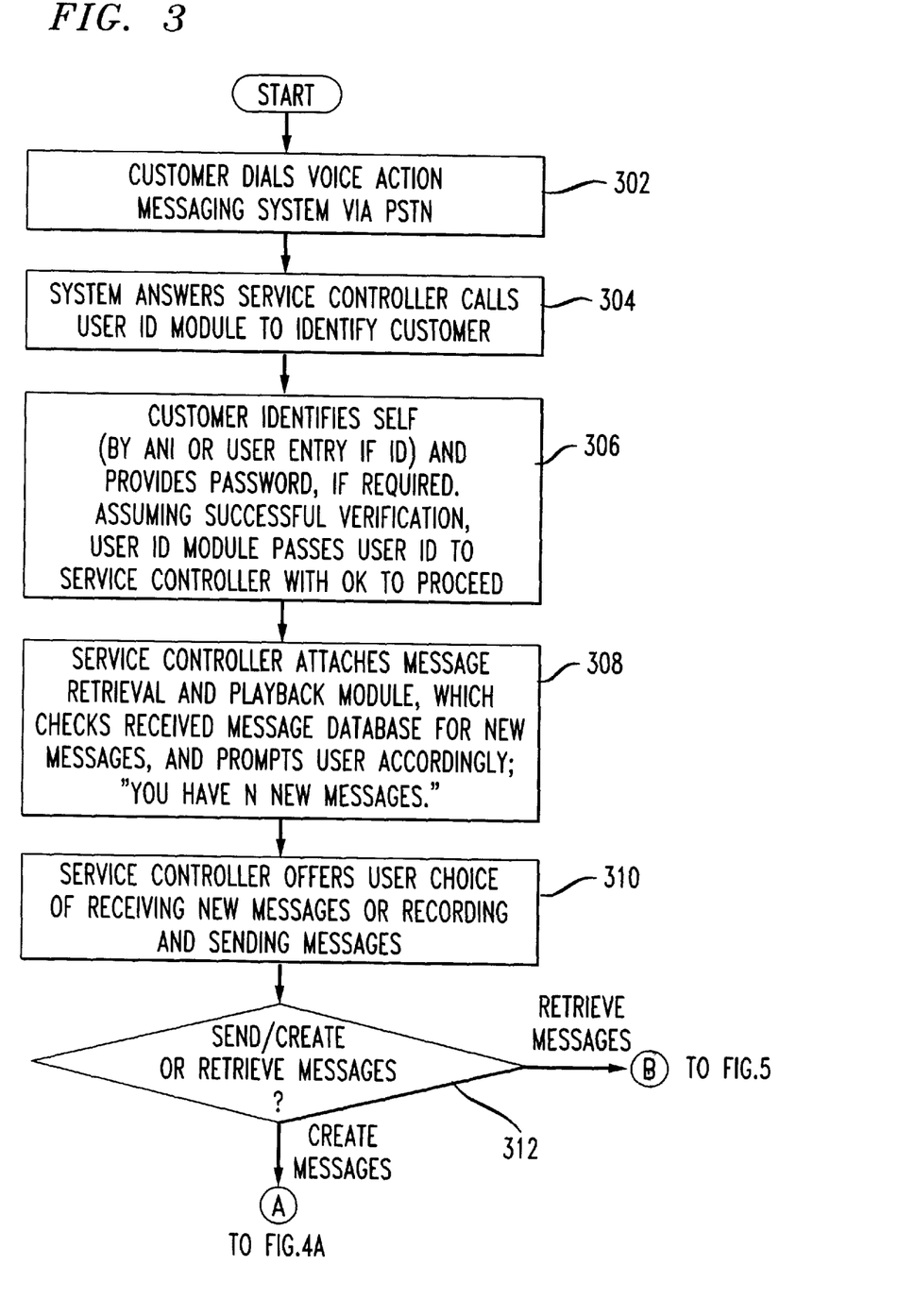
FIG. 3 is a flowchart illustrating access to the illustrative voice mail system, in accordance with the principles of the invention.

FIG. 3 is a flowchart illustrating how users gain access to the voice mailbox system in order to create or retrieve an action message in accordance with the principles of the invention. Such access process is common to both message creation and retrieval.

The process starts at block 302 where the user (i.e., the customer of the voice mail service as either a message creator or message retriever) dials into the voice mail system controller 108 to gain access to the action messaging system via communication network 106 (which, in this illustrative example of the invention, is a PSTN). System controller 108 answers the call using service controller 202 which communicates with the user ID system 204 so as to identify the customer as shown in block 304. The user is prompted to log into the system, as shown in block 306, with a user identification or password. The user may do so by entering a user identification and password, typically by using dual-tone-multifrequency ("DTMF") signals generated by pressing the number pad on the telephone terminal device. Such DTMF signals are commonly known as "touch tones." While the use of DTMF tones and automated response units are illustratively utilized, other interface techniques (including the use of live operators, and automated systems utilizing voice recognition technology) are also intended to fall within the spirit and scope of the present invention. Alternatively, the automatic number identification ("ANI") signal which may accompany the user's call may be used to provide a means of identifying the user to the voice mail system controller 108. After the user's identification is verified, user ID system 204 passes the user ID to service controller 202 with the authorization to proceed with the access process.

After log in, as shown in block 308, service controller 202 comunicates with the message retrieval and playback system 210 which checks the received message data base 222 in memory 110 for new messages. A prompt is played to the user: "you have N new messages" where N is the number of new messages stored for that user. In block 310, service controller 202 offers the user a choice of retrieving the new messages or recording and sending messages, including action messages of the present invention. Depending on the user's choice, as shown in decision block 312, the process continues with that shown in FIG. 4 or FIG. 5.

Figure 4A:
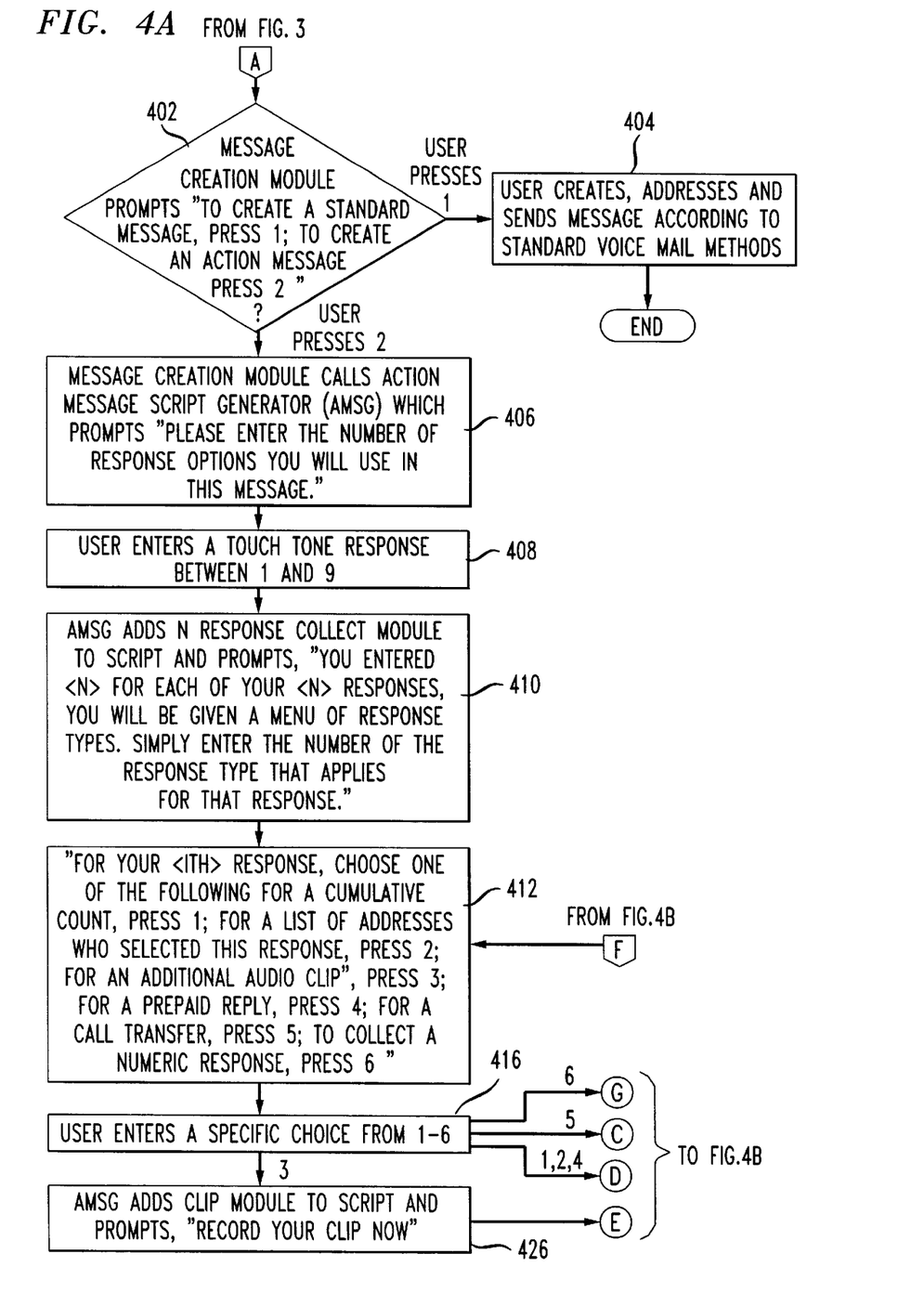
FIG. 4 is a flowchart illustrating the creation of an action message using a telephone interface, in accordance with the principle of the invention.
Figure 4B:
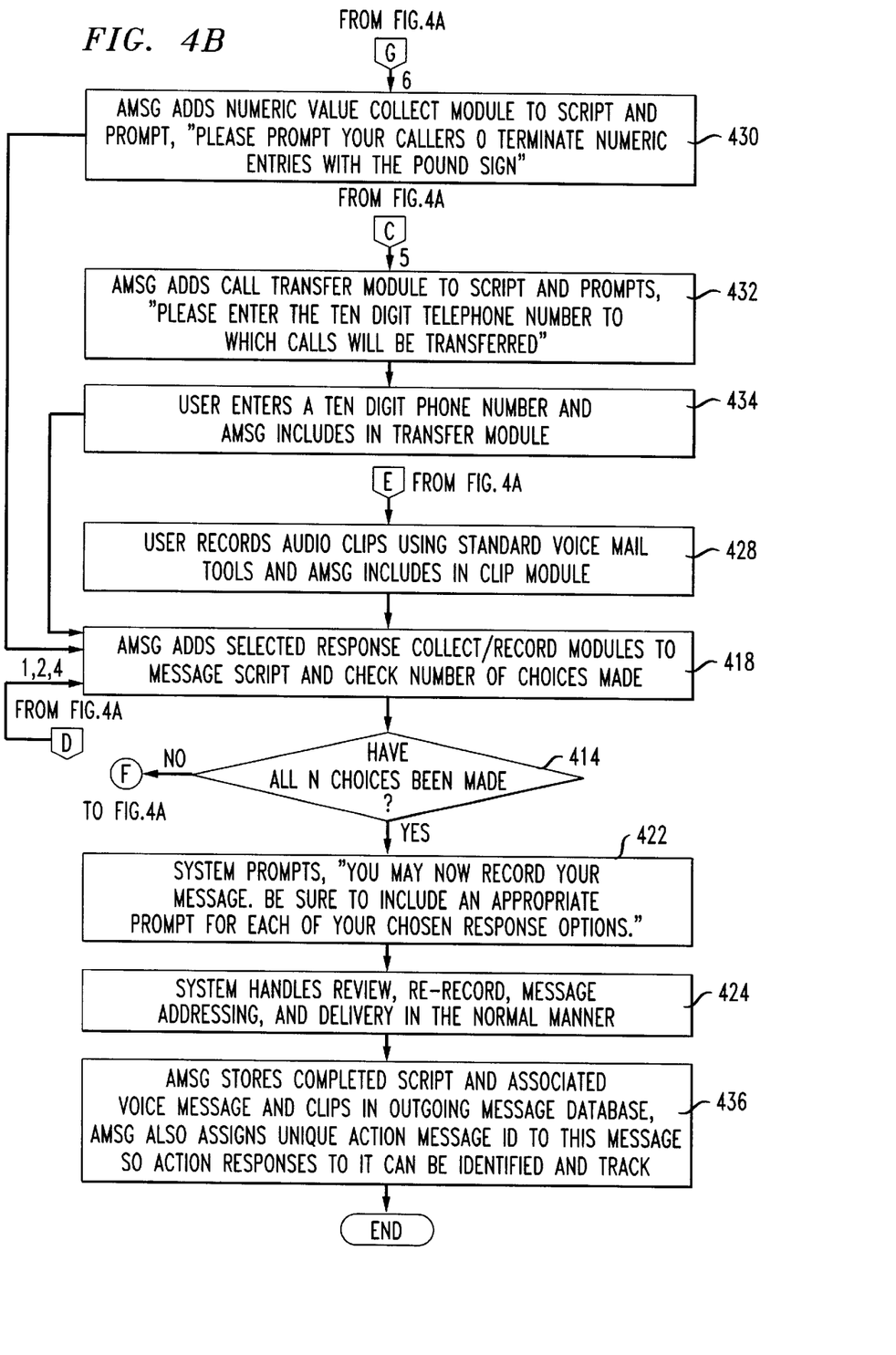

If a user chooses to create a message, then the process as shown in the flowchart of FIG. 4 is applicable. Decision block 402 determines whether an action message or a conventional voice mail message is desired. As shown in FIG. 4, if a conventional method is desired, the user (which in this case is now referred to as the message creator) presses "1" and records a conventional voice message in block 404 which is stored for a later retrieval by a message recipient at terminal 104 (FIG. 1).

Continuing with the description of FIG. 4, if the message creator working at terminal 102 (FIG. 1) desires to create an action message, then a "2" is pressed on the telephone keypad which causes message creation system 212 to call the action message script generator 226 (FIG. 2) which provides an interactive voice response interface for action message creation, in accordance with the invention. Scripting is used in this illustrative embodiment of the invention, to facilitate the generation of instructions to the voice mail system.

The action message script generator 226 prompts the message creator to indicate the desired number of pre-defined responses that will be offered to the voice message recipient as shown in block 406. In this illustrative example of the invention, a number between 1–9 is indicated using the telephone keypad as shown in block 408. As shown in block 410, the action message script generator 226 (FIG. 2), after prompting the user, receives the DTMF tone indicative of the number of desired predefined responses, N, configures the script accordingly. More specifically, action message script generator 226 adds a collect module to the script which accepts the digits 1–N as valid inputs. Appropriate error messages may be created by action message script generator 226 and played for inputs outside this range. The action message script generator also structures the script to include N specific action modules, each associated with one of the N choices. As each action type is subsequently selected by the message creator, the action message script generator 226 appends the associated action module to the script. By this process, once the message creator has fully specified each of the actions 1–N (including the necessary audio clips, call transfer numbers, etc.) the script is complete.

Moving to block 412, a choice of one of six action types may be selected for each pre-defined response. As will be evident in the discussion that follows, the action message script generator iterates through a menu of selections for each of the N pre-defined responses chosen. The iteration runs 1, 2, . . . i . . . N. As shown in block 412, for any $i^{th}$ response, the message creator selects an action type. In this illustrative example for action type 1, a cumulative count of recipients choosing a particular predefined response may be tallied and delivered to the message creator. A voicemail address list of recipients who picked a particular response may be generated as a second action type. An additional audio clip may be played as a third action type. A prepaid reply may be generated as a fourth action type. Further discussion of prepaid replies may be found in our co-pending U.S. patent application Ser. No. 08/723,340, the disclosure of which is incorporated by reference herein. A call transfer may be implemented as a fifth action type. And, as a sixth action type, a numeric response may be collected. It is emphasized that many action types are envisioned to fall within the scope of the invention, and the six types described herein are merely illustrative. Moreover, the variety of action types shown in block 412 are optional, that is, in some applications of the invention, it may be desirable to limit the number of action types.

For example, to minimize complexity for the message creator, a limited number of action message "templates" may be pre-programmed and offered to the message creator from a template menu. Those skilled in the art will appreciate that templates are another convenient form of providing instructions to the voice mail system so as to faciliate practice of the present invention. The pre-programming may be provided by the voice mail service provider or in some instances, by the user. Such templates may include, for example, 1) a two-choice "yes/no" template with individual responses returned to the sender; 2) a four-choice survey template, with cumulative counts returned to the sender; and 3) a two-choice call transfer template (e.g., "if you are satisfied, press 1; if you need to speak with our representative, press 2"). In such a case, the individual respondent's address is returned to the sender. In instances where templates are used, storage and transport requirements for the action message may be reduced, for example, as merely the specifications of the message may be sent and stored. The message retrieval and playback system 210 (FIG. 2), equipped with a similar template as that provided to the action message script generator, can then reconstruct the original action message.

Examples of action messages using each action type noted above will be provided in more detail in later discussion.

In block 416, the message creator indicates to the action message script generator 226 as to which action type is desired for the $i^{th}$ response in the set of N desired pre-defined responses. For types 1, 2, and 4, the voice mail system action message script generator 226 adds the appropriate response collect and record modules to the script and tests whether the iteration is complete for all N responses, as indicated in blocks 418 and 414. If not, another iteration is started by returning to block 412 as shown in FIG. 4. If all N iterations have been completed, then the service controller 212 prompts the message creator to record an audio message as shown in block 422. Upon completion of the recording, the voice mail system controller 108 performs review, addressing, and delivery to one or more desired voice mailboxes (for example, local mailboxes 216 and 218 in FIG. 1) in a conventional manner as shown in block 424. The action message script generator 226 then stores the completed script and associated voice mail message and clips in the outgoing message database 224, as shown in block 436. A unique action message identification is also assigned to the particular action message created for identification and tracking, the details of which are described below in more detail. The total number of recipients for this particular action message may also be conveniently tracked and addresses of the recipients stored at this point in the process. Such tracking of total number of intended recipients and storage of their addresses may be useful, for example, to determine the success rate of a particular message and to identify who has not responded to a particular message.

For action type 3, the action message script generator adds a voice clip module to the script and prompts the message creator to record the audio clip as shown in block 426. In block 428, the message creator records the audio clip in a conventional manner. Control is then passed to block 418 and the process continues as discussed above.

For action type 6, the action message script generator 226 adds a numeric value collect module to the script and informs the message creator that the message recipients should terminate numeric entries with the pound sign as shown in block 430. Control is then passed to block 418 and the process continues as discussed above.

For action type 5, the action message script generator 226 adds a call transfer module to the script and prompts the message creator to enter the telephone number to which calls are to be transferred, as shown in block 432. The message creator enters the number using the telephone keypad, as shown in block 434. Control is then passed to block 418 and the process continues as discussed above.

The completed script and modules, as described above, are saved for delivery to the appropriate voice mailbox system of the intended recipient. The script and associated modules form the basis for supplying instructions to a voice mailbox system to implement the desired action message. These instructions, which may be referred to as a "datagram," when acted upon trigger the action portion of the voice mail message to implement the features of the present invention.

Several examples will now be discussed to further highlight the invention. As mentioned previously, a computer business may use an action message to survey the last 100 customers who have purchased a computer from their business. In such an example, the message creator presses "3" on the telephone keypad as in block 410 of FIG. 4 to indicate that three predefined responses are desired for inclusion in this particular action message. In block 416, the message creator presses "1" on the telephone keypad to indicate that cumulative responses are desired. After three iterations, the representative of the computer business records the message:

"press one on your touch tone phone if you primarily use your computer at home; press two if you primarily use your computer at work; or press three if you use your computer at both home and work."

Since the first action type was selected by the computer business for each predefined response, a cumulative count of the number of times each pre-defined response is selected by the recipients is tallied by the voice mail system controller 108 and stored in memory 110 for delivery to the business, for example, using the business's voice mailbox in either a local or remote voice mail system. In block 424 of FIG. 4, the business would address the action message to the 100 intended recipients using conventional methods, for example, automated voice mailing lists and the like. In addition, a conventional computer interface may be used to interact with the voice mail system controller 108 (FIG. 1) through data modem 208 (FIG. 2) to create and receive action messages and responses, in accordance with the principles of the invention.

Action type 1 may also be useful in informal opinion polling. For example, a newspaper may send out an action message to its subscribers asking them to indicate which comic strips are the most popular.

Action type 2 provides for return addresses of the recipients to be returned to the message creator. Such information may facilitate the request for more information by interested recipients. For example, a mutual fund company may choose action type 2 for the message "please press one to receive a prospectus of our latest offering." Upon receipt of the appropriate DTMF tone during playback of the message to the recipient, the voice mail system controller 108 would collect that recipient's voice mail address for delivery to the company. Those skilled in the art will appreciate that the return addresses may be used to automatically send out the appropriate information when they are received.

Action type 3 facilitates the playback of additional audio information to the action message recipient, and the number of times the response was selected may be tallied. For example, a record company may select action type 3 to accompany the message "to hear a sample of our latest compact disc, press one on your touchtone keypad." It is also noted that a combination of action types may be mixed in the same action message. Continuing with the record company example, the record company may record the action message "press one if you prefer rock music, two if you prefer jazz, and three if you would like to hear a sample of our latest compact disc." Action type 1 would be selected for pre-defined responses one and two, and action type 3 would be selected for the third pre-defined response.

Action type 4, the prepaid reply, offers the action message recipient a chance to record a return message at the expense of the original message creator. Such a choice may be particularly desirable, for example, in the context of commercial solicitations for customer opinions. Those skilled in the art will also recognize that such prepaid replies may be desirable for games and contest applications, or for customer feedback about a new product, for example.

Action type 5 provides an opportunity to launch a telephone call as a direct response to the original message. An example highlighting this particular inventive feature is a sports retailer who is promoting a sale on golf clubs. The action message may include general information about price and features of the promoted clubs and then give as one of several pre-defined responses "press 1 if you would like to be transferred to our customer order hotline." When the recipient presses "1," the voice mail system controller 108 communicates with communication network 106 to allow an outbound call to be placed to the sports retailer and the recipient is transferred and bridged in a conventional manner.

Action type 6 enables an action message recipient to enter numeric data which will be forwarded to the message creator. The voice mail address or identification may also optionally be forwarded. Examples of numeric data include social security number, credit or calling card account numbers, a product stock number for a catalog purchase, a prior order tracking number, and the like.

Figure 5:
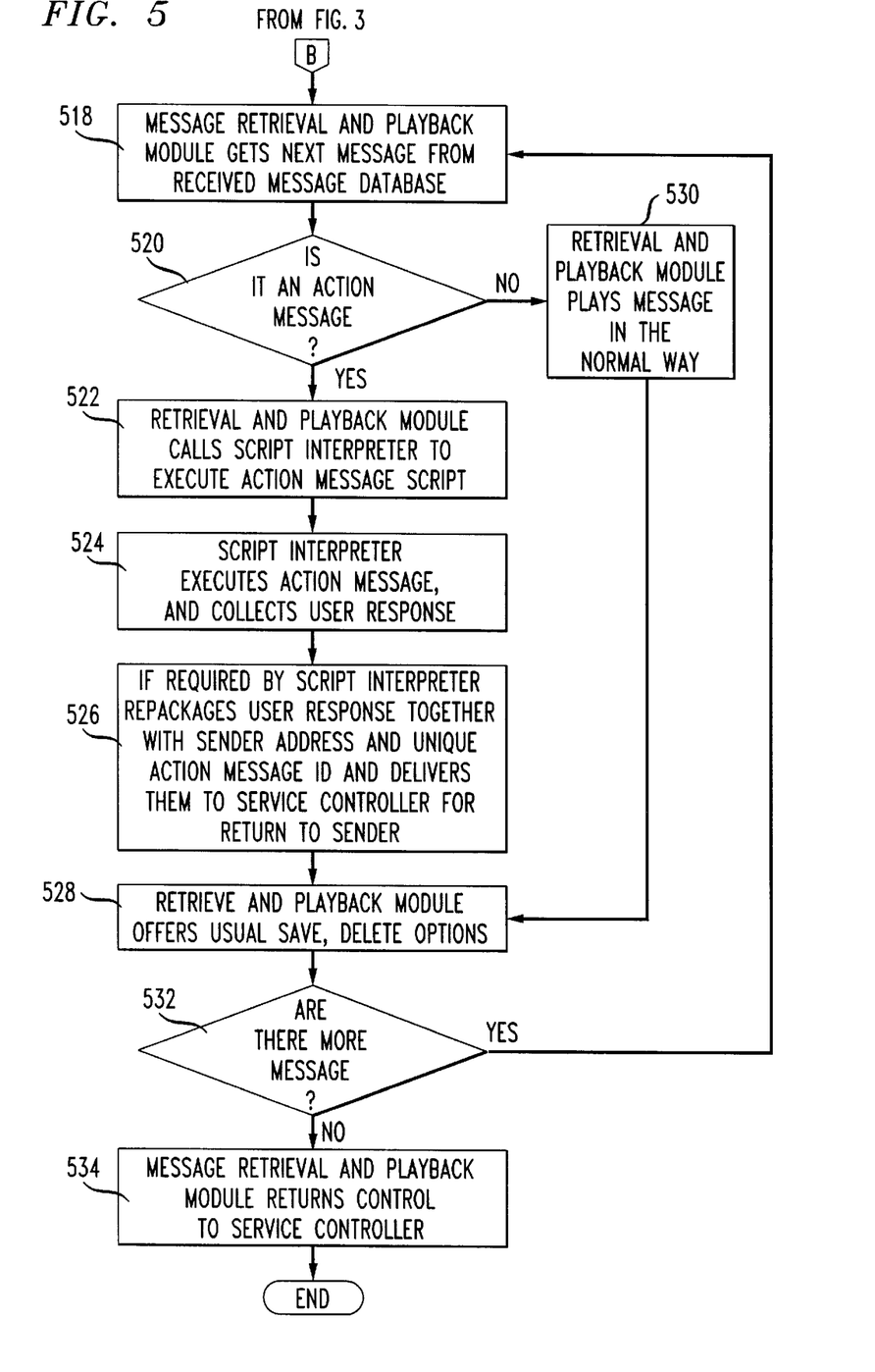
FIG. 5 is a flowchart illustrating the retrieval and playback of an action message from a recipient's voice mailbox, in accordance with the principles of the invention.

FIG. 5 is a flowchart illustrating the playback of an action message from a recipient's mailbox, in accordance with the principles of the invention. The process continues (from the block 312 of the access process discussed when referring to FIG. 3) with the message retrieval and playback system 210 getting messages from received messages database 222 in memory 110 (FIG. 1), as shown in block 518. The new messages contained in the received messages database 222 for that particular user could be a mix of conventional and action messages, in accordance with the invention.

In block 520, message retrieval and playback system 210 determines whether a retrieved message is an action message. If a retrieved message is an action message, then message retrieval and playback system 210 calls action message script interpreter 228 to execute the particular pre-defined responses and action types, as described above, in an action message script as shown in block 522. The responses selected by the action message recipient are collected as shown in block 524. As appropriate, the voice mail ID or address is packaged with the selected responses in block 526. In addition, a unique action message identification is included with the selected responses which are delivered to the service controller 202 for return to the message creator. In block 528, typical save, delete, forwarding and other fixed options are provided to the message recipient.

If the result of decision block 520 is that the message is a conventional message (and not an action message), then control is passed to block 530 where the conventional message is played back to the message recipient in a conventional manner.

The playback process continues through blocks 518 to 532 in an iterative manner until no more new messages are available, at which point playback control is returned to service controller 202 as shown in block 534.

Figure 6:
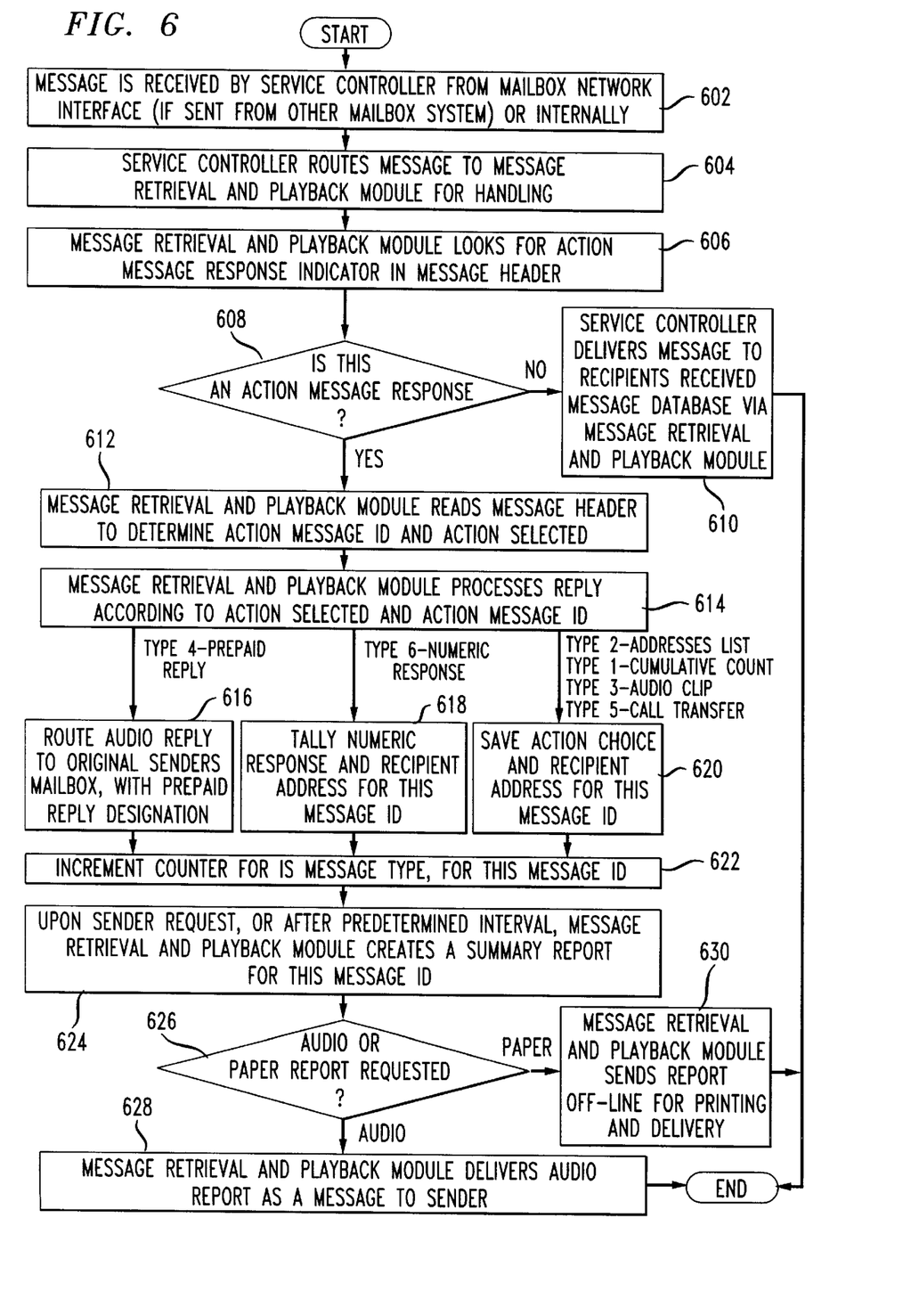
FIG. 6 is a flowchart illustrating collection, tabulation, and retrieval of action message responses, in accordance with the principles of the invention.

FIG. 6 is a flowchart illustrating collection, tabulation, and retrieval of action message responses by the exemplary voice mail system 112 (FIG. 1), in accordance with the principles of the invention. The process starts in block 602 where a voice mail message is received by the service controller 202. It is also noted that the message received by the service controller 202 may be a conventional voice mail message, an action message (created in accordance with the flowchart shown in FIG. 4), or an action message response sent by the recipient of an action message. The voice mail message could be received, internally, from voice mail system 112, or from other voice mailbox systems 216 and 218 (FIG. 2). Service controller 202 routes the voice mail message to message retrieval and playback system 210, as shown in block 604. Moving to block 606, message retrieval and playback system 210 looks for an action message response indicator in the voice mail message header. If the result of decision block 608 is that the voice mail message received by service controller 202 is not an action message response (i.e, it is either an action message or a conventional voice mail message), then service controller 202 delivers the message to the recipient's received messages datebase 222 via the message retrieval and playback system 210, as shown in block 610.

If an action message response is received by service controller 202, then block 612 is reached, and message retrieval and playback system 210 reads the message header so that the action type and action message ID are determined. Continuing with block 614, message retrieval and playback system 210 processes the response according to the selected action type and action message ID.

Figure 9:
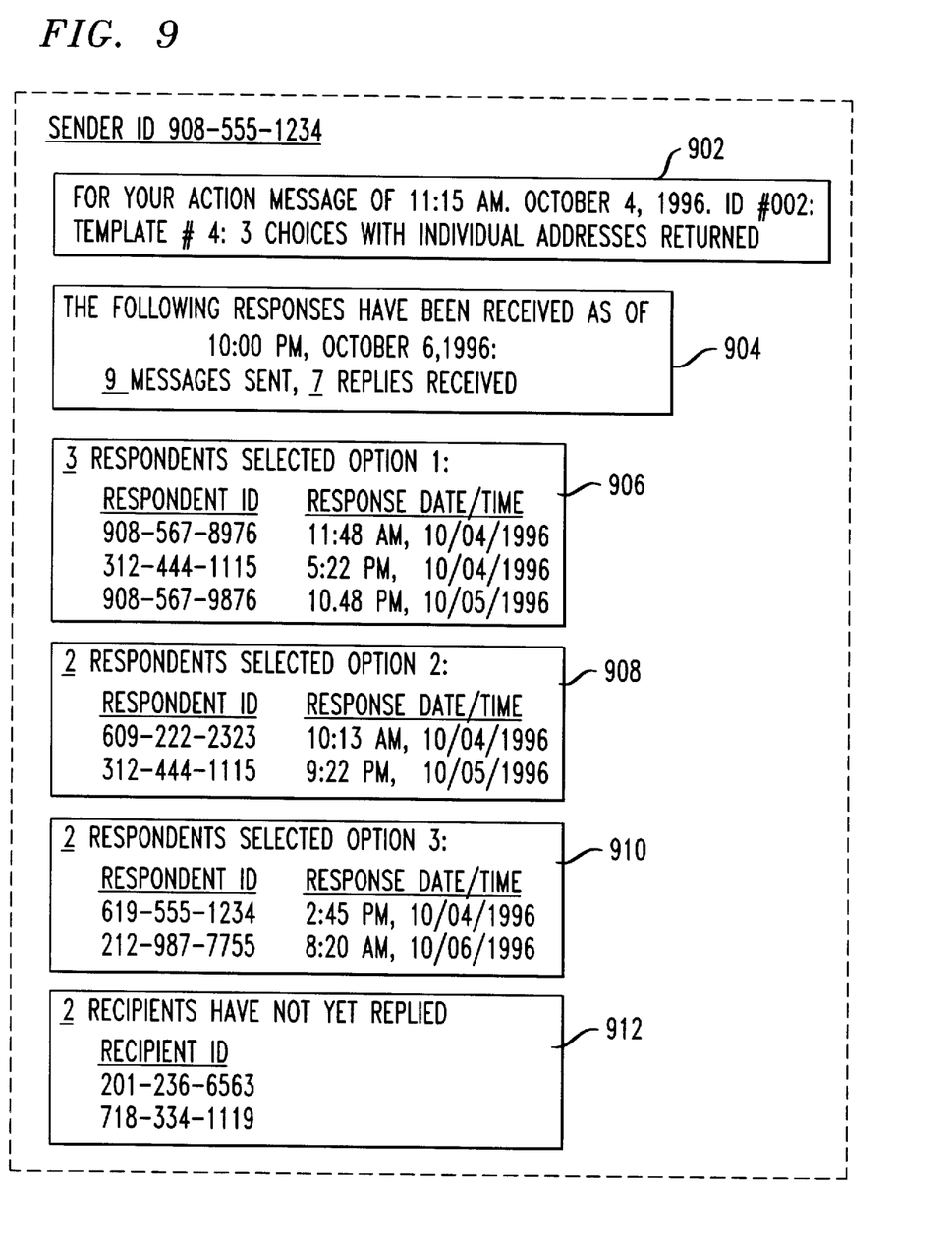
FIG. 9 is an exemplary action message results report, in accordance with the principles of the invention.

For action types 1, 3, and 5, control is passed to block 622 where a counter is incremented for this type of action according to action message ID in a reply summary report. An illustrative reply summary report is shown in FIG. 9. A summary report may be generated upon request of the sender, after some predetermined interval, or after a predetermined number of recipients have responded. For example, a summary report may be prepared hourly, daily, or weekly, or perhaps 24 hours after a particular action message is sent by the sender. The summary report may be in audio or paper format as shown in blocks 626, 628 and 630 in FIG. 6.

For action type 4, control is passed from block 614 to block 616 where an audio reply is routed to the sender's voice mailbox with a prepaid reply designation. Control is then passed to block 622 where the counter is incremented for this action type according to the message ID as described above.

For action type 6, control is passed from block 614 to block 618 where numeric responses are tallied and the recipient's collected according to the message ID. Control is then passed to block 622 where the counter is incremented for this action type according to the message ID as described above.

For action type 2, control is passed from block 614 to block 620 where both the action type and recipient addresses are collected. Control is then passed to block 622 where the counter is incremented for this action type according to the message ID as described above.

Figure 8:
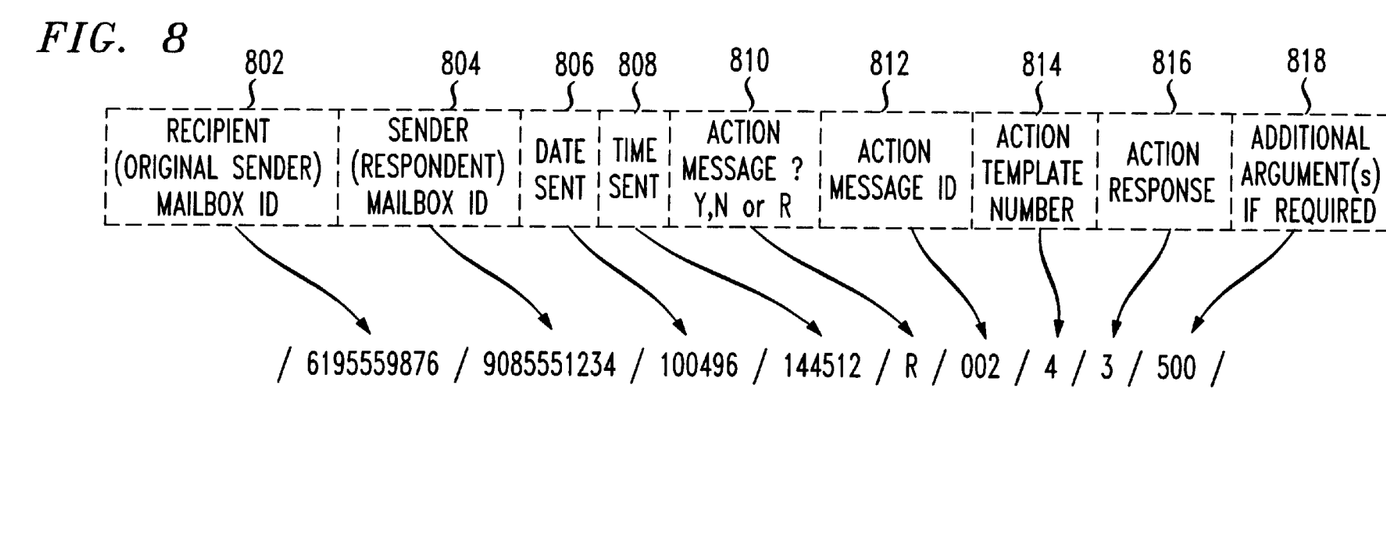
FIG. 8 is an illustration of an exemplary action message reply record, in accordance with the principles of the invention.

FIG. 8 is an illustration of an exemplary action message reply record, in accordance with the principles of the invention. Those skilled in the art will appreciate that the reply record is one means of supplying the originating sender of the action message with a response to action message. An exemplary action message reply record is shown in FIG. 8. The reply record may be generated by message retrieval and playback system 210, at the recipient's mailbox system, and added to a reply summary report as shown in block 624. The reply record includes nine fields. Field 802 is used to identify the recipient of the action message response by voice mailbox ID. In accordance with the invention, the recipient of the action message response is the original sender of the action message. Similarly, field 804 is used to identify the sender of the action message response by voice mailbox ID. In accordance with the invention, the sender of the action message response is the recipient of the original action message. Fields 806 and 808 are used to indicate date and time of the response, respectively.

Field 810 is used to indicate the status of the record as being either an action message, not an action message (i.e., a conventional voice mail message), or a reply to an action message. Those skilled in the art will appreciate that the use of field 810 allows the reply record to be used as a general record with applicability to more than simply action message responses.

Field 812 indicates a unique action message ID. Field 814 indicates an action template number. As discussed above, templates are used to simplify or facilitate certain interactions with the voice mail system. Field 816 is used to indicate the action type, and field 818 is used to communicate additional arguments or information as needed. It is emphasized that all the fields in FIG. 8 are illustrative, and are optionally utilized with the invention.

Figure 7:
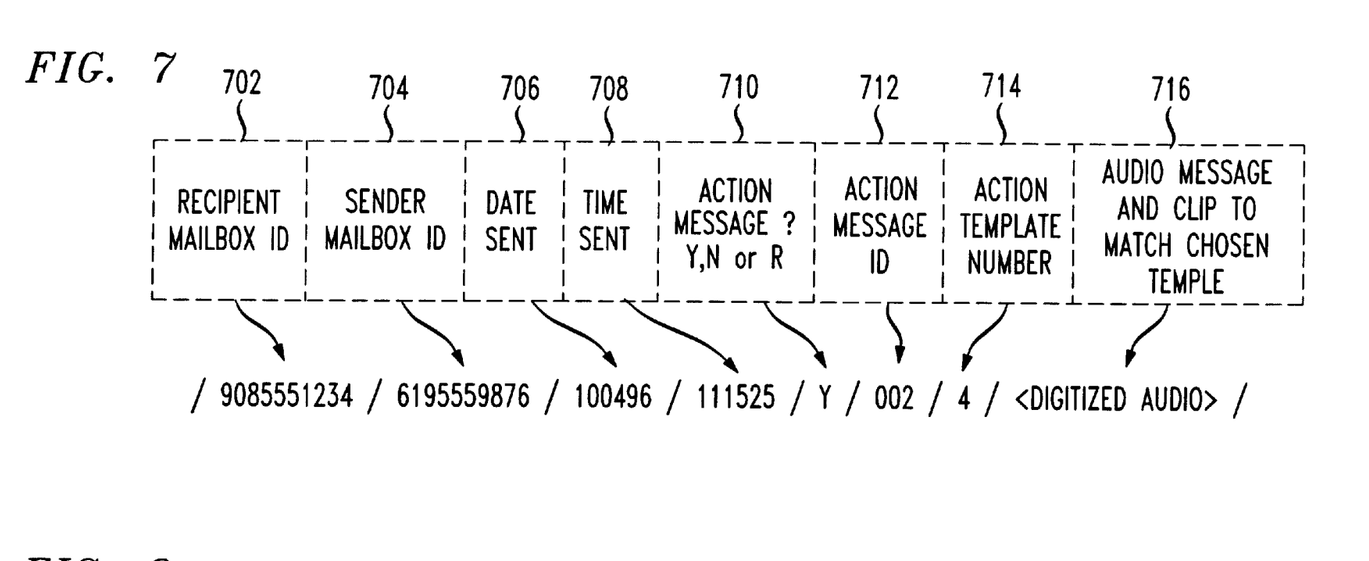
FIG. 7 is an illustration of an exemplary action message file, in accordance with the principles of the invention.

FIG. 7 is an illustration of an exemplary action message file, in accordance with the principles of the invention. The action message file includes eight fields. Fields 702 to 714 correspond in format and function to fields 802 to 814 in FIG. 8. Field 716 is utilized to actually store the digitized audio message content portion of the action message, as well as the associated audio clips included in embedded action message responses. It is emphasized that all the fields in FIG. 7 are illustrative, and are optionally utilized with the invention.

FIG. 9 is an exemplary action message reply summary report, in accordance with the principles of the invention. The reply summary report provides results achieved from the collection and tabulation of action message responses within a predefined time period or upon specific request of the sender. Accordingly, each action message reply record (FIG. 8) is used to create the results report. As shown in FIG. 9, for this illustrative report, the sender is informed as to the results of a particular action message that the sender created on a particular time and date, as shown in field 902. The template used by the sender is also identified. Field 904 identifies the number of messages sent and responses received as of a particular status time. A tally for each option provided to the recipient is provided in fields 906, 908, and 910, as shown. Field 912 indicates that two recipients, identified by voice mail ID, have not yet responded to the action message.

The invention claimed is:

1. A method for use with an voice mail system, the method comprising the steps of:

receiving at a receiving apparatus a mail message created by a message sender at a sending apparatus for delivery to a message recipient's voice mailbox, where the message comprises a message body and at least one datagram that contains information which enables the message recipient to perform a first action or a second action that is other than a rejection of said first action and that is explicitly specified by the message sender via said information from among a variety of actions that said message sender could specify; and providing both said message body and said at least one datagram to said recipient's mailbox so that said recipient may access both said voice mail message and said at least one datagram and perform said at least one action.

2. The method of claim 1 wherein said action includes creating, formulating, or formatting a response and sending said response to said message sender.

3. The method of claim 1 wherein said action includes connecting said message recipient to a called party over a telephone network.

4. The method of claim 1 wherein said action includes playing a pre-recorded audio clip to said recipient.

5. The method of claim 1 wherein said action includes collecting data from said recipient.

6. The method of claim 5 further including a step of sending said collected data to said message sender.

7. The method of claim 1 wherein said action includes sending a voice reply from said recipient to said message sender.

8. The method of claim 7 wherein said voice reply is a prepaid voice reply.

9. The method of claim 1 further including a step of sending an identification of said message recipient to said message sender.

10. The method of claim 1 wherein said message body comprises a voice message.

11. The method of claim 1 where the receiving apparatus is remote from the sending apparatus.

12. A method comprising the steps of:

receiving at a voice messaging platform instructions sent by a message sender and associated with a voice mail message sent by said message sender, said instructions comprising a plurality of actions pre-defined by said message sender, including at least a first action and a second action that is other than a rejection of said first action; and performing an action of said plurality of actions, based on a response provided by a recipient of said voice mail message.

13. The method of claim 12 wherein said performing an action includes sending a response to said message sender.

14. The method of claim 12 wherein said performing an action includes connecting said message recipient to a called party over a telephone network.

15. The method of claim 12 wherein said performing an action includes playing pre-recorded audio clip to said recipient.

16. The method of claim 12 wherein said performing an action includes collecting data from said recipient.

17. The method of claim 16 further including a step of sending said collected data to said message sender.

18. The method of claim 12 wherein said performing an action includes sending a voice reply from said recipient to said message sender.

19. The method of claim 18 wherein said voice reply is a prepaid voice reply.

20. The method of claim 12 further including a step of sending an identification of said recipient to said message sender.

21. A method including the steps of:

sending a voice mail message created by a message sender to a message recipient's voice mailbox; and sending a plurality of actions, including a first action a second action that is other than a negation of said first action, associated with said voice mail message wherein said plurality of actions is pre-defined by said message sender so that a recipient of said voice mail message is enabled to respond to said original voice mail message in a manner that is pre-defined by said voice mail message sender.

22. A method including the steps of:

receiving a reply associated with an original voice mail message created by a message sender wherein said reply is one of a plurality of responses to said original voice mail message that were explicitly pre-defined by said message sender in said original voice mail message, the responses including more than just a single response or a lack thereof;

determining a voice mail message recipient of said reply according to an address contained in said received reply; and providing said received reply to said voice mail message recipient.

23. A method for communicating voice mail message from a sender to a recipient comprising the steps of:

the sender creating a voice mail message body, the sender creating at least one datagram that controls interactions of the recipient with said message and associated said at least one datagram with said message body, said datagram including an option to perform a first action or a second action that is more than a rejection of the first action, combining said message body with said associated at least one datagram to form said voice mail message, and sending said voice mail message to said recipient.

24. A method for use with an voice mail system, the method comprising the steps of:

receiving at a receiving apparatus a voice mail message created by a message sender at a sending apparatus for delivery to a message recipient's mailbox, where the message comprises a message body and at least one datagram that contains information which enables the message recipient to perform at least one action that is explicitly specified by the message sender via said information from among a variety of actions that said message sender could specify that includes more than selecting an action or not selecting said action; and providing both said message body and said at least one datagram to said recipient's mailbox so that said recipient may access both said voice mail message and said at least one datagram and perform said at least one action.

25. A method for communicating an voice mail message from a sender to a recipient comprising the steps of:

the sender creating a message body, the sender creating at least one datagram that explicitly specifies one or more actions from a collection of actions that said sender can specify, said collection including more than a request to record a response, that a recipient of the voice mail message may perform when accessing said voice mail message, combining said message body with said associated at least one datagram to form said voice mail message, and sending said voice mail message to said recipient.

* * * * *